No. 852,997. PATENTED MAY 7, 1907.
A. G. BRANDRAM.
JOINT FOR SEWER AND LIKE PIPES.
APPLICATION FILED DEC. 22, 1906.
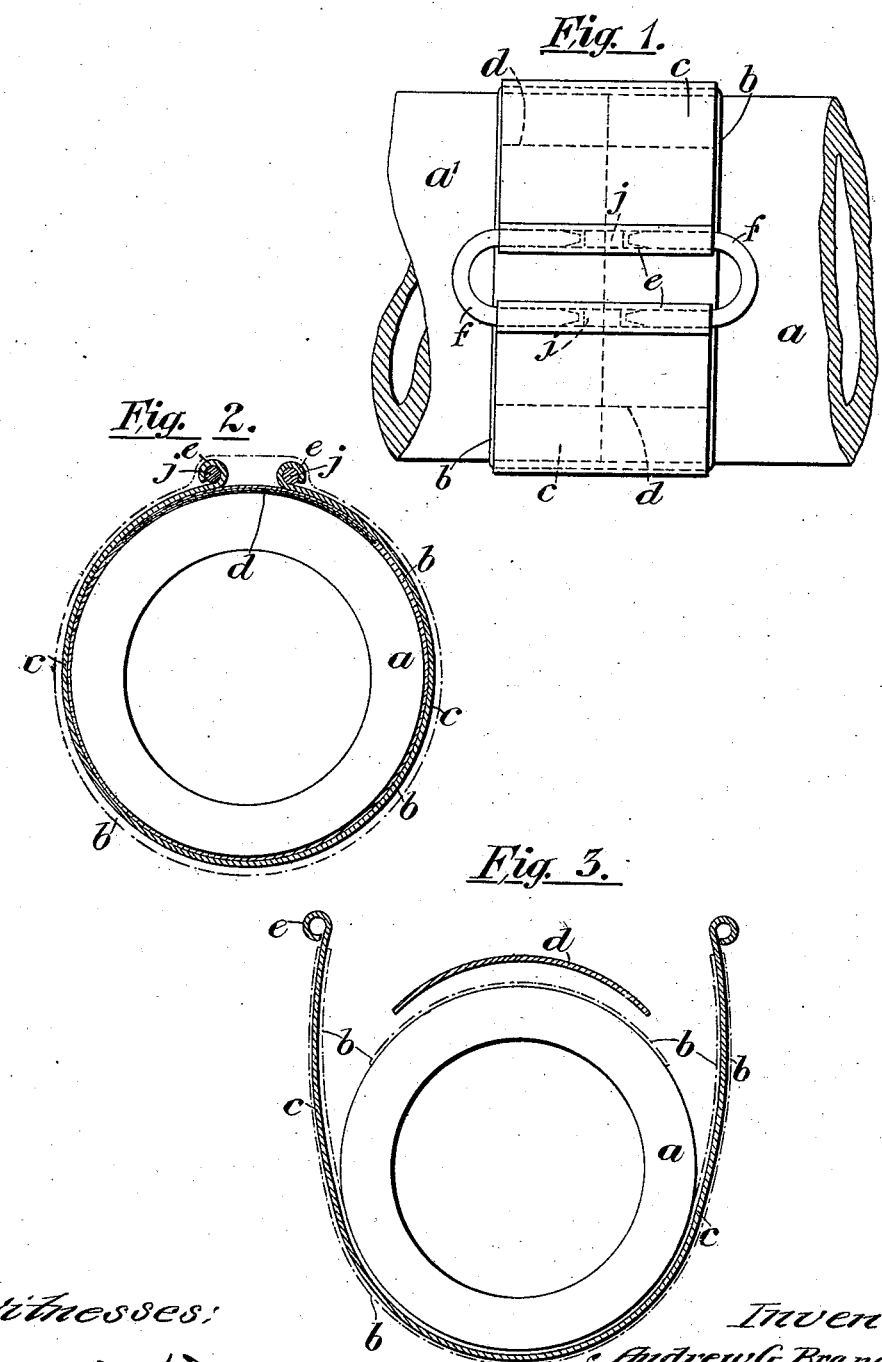

UNITED STATES PATENT OFFICE.

ANDREW GEORGE BRANDRAM, OF SOUTHSEA, ENGLAND.

JOINT FOR SEWER AND LIKE PIPES.

No. 852,997.　　　Specification of Letters Patent.　　　Patented May 7, 1907.

Application filed December 22, 1906. Serial No. 349,103.

*To all whom it may concern:*

Be it known that I, ANDREW GEORGE BRANDRAM, a subject of the King of Great Britain, residing at Southsea, England, have invented certain new and useful Improvements in Joints for Sewer and Like Pipes, of which the following is a specification.

This invention relates to improvements in joints for sewer and like pipes and it has for its object to provide a durable and water-tight connection for stoneware, earthenware, concrete or metal pipes or tubes.

The joint is non-rigid, that is to say, of such nature that in the event of a slight subsidence of the ground after the pipes have been laid, it will yield sufficiently to permit the pipes to be deflected and the line thereof to correspond more or less with the contour of the surface supporting them, at the same time remaining water-tight.

The invention is applicable to pipes with butt ends, or with rabbeted ends, or with any form of end that does not involve a projection on the exterior surface of the barrel, and it does not otherwise require a special form of end thus enabling a cheap form of pipe to be used. It also effects a saving of time and labor in making the joints for laying a line of pipes.

The invention consists essentially in the employment of a practically continuous flat band of metal nearly as long as the external circumference of the pipes and surrounding the ends of the pipes at their junction and which prior to its application thereto is coated with heated bitumen.

A bridge piece or plate of metal also coated with bitumen is placed beneath the ends of the band, and the band is then drawn tightly round the pipes so that a considerable pressure is exerted upon the bitumen; the ends of the band being secured together a perfectly watertight joint results, which as aforesaid permits of considerable deflection upon the part of the pipes without causing leakage.

I may employ in conjunction with the metal plate and band a wrapping of canvas or other material saturated with heated bitumen encircling the pipes and placed within the said band. If desired the outer peripheries of the adjacent ends of the pipes may also receive a coating of bitumen.

As another means of preventing the entry of the heated bitumen to the interior of the pipes, I may employ a padded drum or other device introduced into the pipes and located at the joint to exclude the bitumen from the bore of the pipe, while at the same time permitting it to enter the interstices between the ends of the pipes.

In the drawings appended—Figure 1 is a plan showing a joint constructed in accordance with the present invention. Fig. 2 is a section taken at the point of juncture of two pipes. Fig. 3 illustrates a stage in the formation of the joint.

In these drawings, $a$ $a'$ indicate the adjacent ends of two pipes, and $b$ the bitumen. In practice the bitumen is broken down with a suitable quantity of asphalt or other oil varying in accordance with the temperature of the atmosphere or local conditions at the time of making the joint; for example, the quantity of oil employed would be greater in the winter than in the summer and greater in cold climates than in hot climates. In all cases the bitumen should be reduced to such consistency as to be somewhat plastic when cold.

$c$ indicates a flat metal band encircling the ends of the pipes and beneath the ends of which band is placed a plate $d$ so that when the ends of the said band are secured the pipes are surrounded by a practically continuous band of metal. The ends of the band are each turned or bent into tubular form as shown at $e$ Figs. 2 and 3, and are secured together by any suitable means for example by means of staples $f, f$ inserted in the ends of the tubular portions $e$ as shown in Fig. 1. The band $c$ and plate $d$ are preferably formed of mild steel. For convenience of manipulation of the metal band when making the joint I use wire loops or handles inserted in the ends $e$. Such handles are removed prior to the application of the permanent fastening means. When about to make the joint the band is coated with heated bitumen which may be done by immersing it in a caldron containing the heated bitumen whereby it receives a coating upon both its inner and outer surfaces. The inner surface of the band may have additional coats of bitumen applied thereto. The band so treated is placed to the extent of one half of its width under the end of the pipe, the other half of the width of the band projecting beyond the end of the pipe. The next pipe is then placed in position with its end abutting the end of the first pipe. Heated bitumen is poured on the top of the pipes and while the bitumen is soft the plate $d$ is laid thereon and pressed down and a further quantity of bitumen may be poured over it. The band $c$ is then caused to encircle the pipes, the ends of said band being drawn together by means of a suitable cramp which engages the tubular ends $e$. In order to prevent collapse of the tubular ends $e$ under the pressure necessary to draw them together, I may strengthen them by metal or other pins $j$ occupying the middle portions of their length. When the band is drawn sufficiently tight, the staples $f$ or other fastening means are applied to sesure the ends together, and the cramp is then removed. The band should not be so strong as to crush the pipes when the cramping pressure is exerted, but the tubular ends $e$ should rather be the first to give way by beginning to unroll, which is a good indication that the band is drawn sufficiently tight. Under the influence of the great pressure exerted by the band the bitumen is forced well into the surface of the pipes so that perfect cohesion between the pipes and bitumen is obtained and a joint of great strength and tightness results. The pressure further precludes the formation of air bubbles in the bitumen which would be likely to impair the efficiency of the joint.

In the case of pipes of large diameter I may use bands made in two or more lengths, each pair of ends being drawn together and fastened as herein described, or some of the parts may be united by hinges.

The bands aforesaid add strength to a line of pipes at its weakest points. If desired one or more such bands lined with bitumen may be applied to pipes or conduits of earthenware, cement or concrete at intermediate points, in order to still further strengthen the pipes or conduits against bursting pressure. In such cases the coating of bitumen should only be thick enough to take up any inequalities in the surface of the pipes or conduits.

As aforesaid I may if desired employ a length of canvas or other textile material which is wrapped round the pipes at their point of juncture, the subsequent operations incidental to the formation of the joint being performed in the manner and order previously described.

In order to protect the metal band, plate and fastenings against corrosion, I may treat them with a protective solution such for example as that known as the "Angus Smith."

What I claim is:—

1. A pipe joint comprising substantially cylindrical abutting pipe ends, a flat metal band having eyes at its ends and extending nearly around said pipe ends, said band being coated with plastic bitumen, a plate also coated with plastic bitumen and extending between and beneath the ends of said band, and staples for uniting the eyes at the ends of the band after the latter has been forcibly compressed around the pipe ends while the bitumen is plastic.

2. A pipe-joint comprising substantially cylindrical abutting pipe-ends, a flat metal band having eyes at its ends and extending nearly around said pipe-ends, a plate extending between and beneath the ends of said band, a coating of bitumen on said band and plate, and staples for uniting the eyes at the ends of said band.

3. A flat metal band having tubular eyes at its ends and cores arranged in the central parts only of said eyes, for the purpose specified.

4. A pipe-joint comprising substantially cylindrical abutting pipe-ends, a flat metal band, extending nearly around said pipe-ends, tubular eyes at the ends of said band, cores in the central parts only of said eyes, a plate extending between and beneath the ends of said bands, a coating of bitumen on said band and plate, and staples for extending into the ends of said eyes.

In testimony whereof I have hereunto set my hand in presence of two subscribing witnesses.

ANDREW GEORGE BRANDRAM.

Witnesses:
E. T. STEWART,
A. D. CASSELL.